United States Patent [19]
Snyder et al.

[11] 3,756,547
[45] Sept. 4, 1973

[54] MANUALLY RELEASED REFINING CONTROL

[76] Inventors: Stephen L. Snyder, 331 Cherry Hill Blvd., Cherry Hill, N.J. 08034; Robert A. Mathews, Jr., 3015 Lincoln Rd., McHenry, Ill. 60050

[22] Filed: Apr. 13, 1971

[21] Appl. No.: 133,664

[52] U.S. Cl. ............................................. 244/152
[51] Int. Cl. ........................................ B64d 17/08
[58] Field of Search .................... 244/152, 149, 142, 244/138 R, 138 A, 147, 148

[56] References Cited
UNITED STATES PATENTS

| | | | |
|---|---|---|---|
| 3,049,322 | 8/1962 | Vlasic | 244/152 |
| 3,506,225 | 4/1970 | Snyder | 244/149 |
| 3,586,269 | 6/1971 | Hensley | 244/152 |
| 3,010,685 | 11/1961 | Stencel | 244/147 |
| 2,919,085 | 12/1959 | Horning | 244/152 X |

Primary Examiner—Milton Buchler
Assistant Examiner—Carl A. Rutledge
Attorney—Clarence A. O'Brien and Harvey B. Jacobson

[57] ABSTRACT

Staged inflation of a parachute is accomplished under manual control of the jumper. A pair of snubber loops anchored to the parachute canopy are threaded through guide rings peripherally spaced about the canopy to initially restrict inflation. A releasable lock pin prevents withdrawal of the loops from the guide rings under canopy inflating pressure.

16 Claims, 12 Drawing Figures

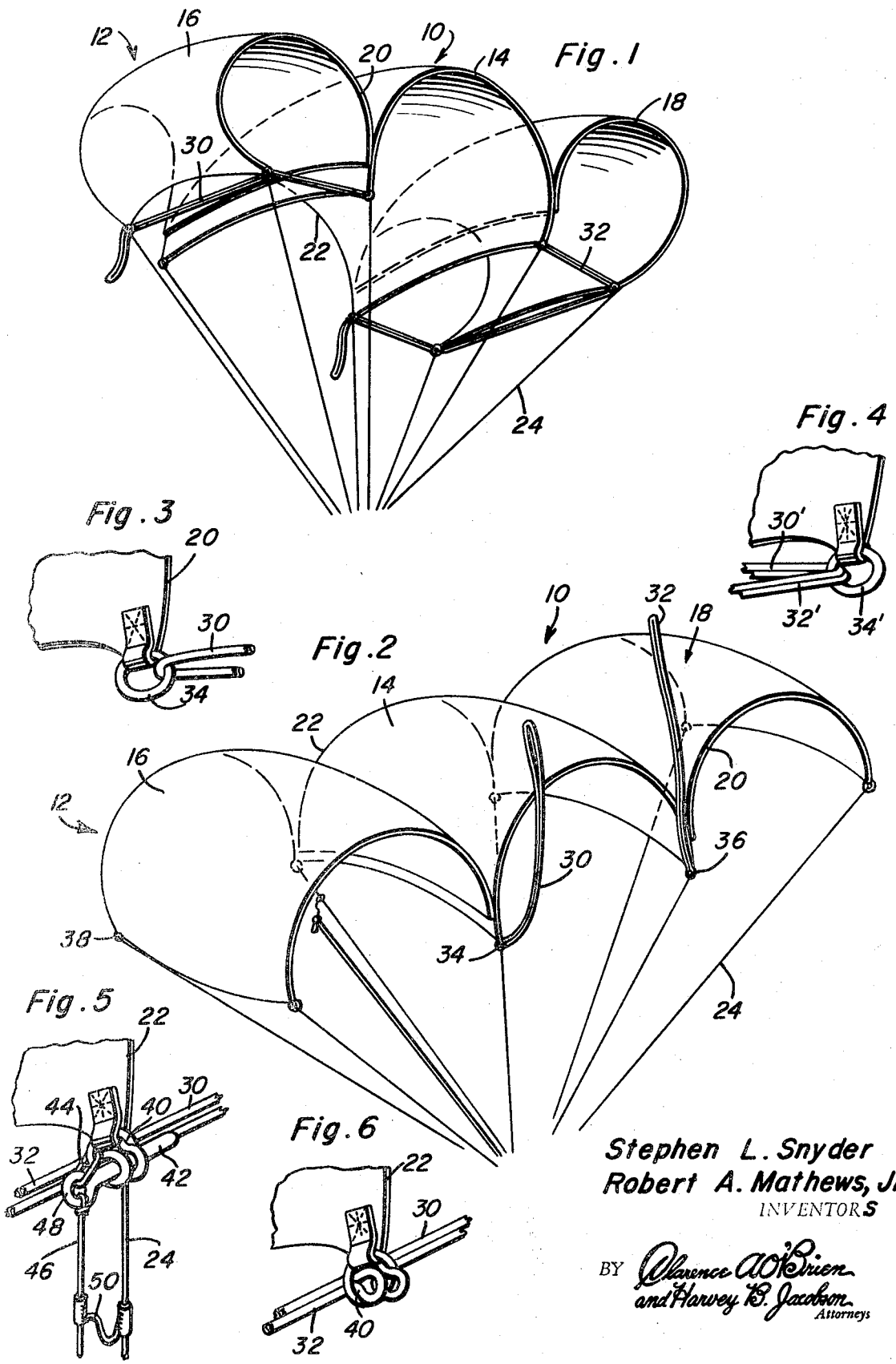

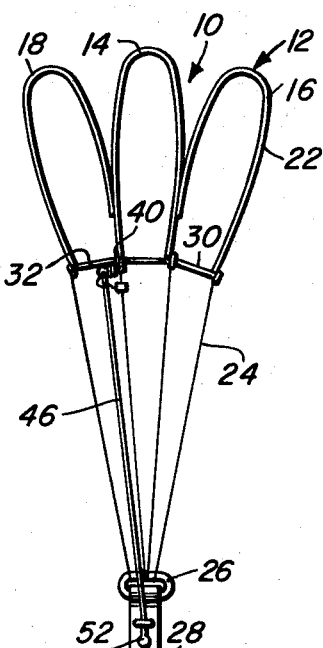
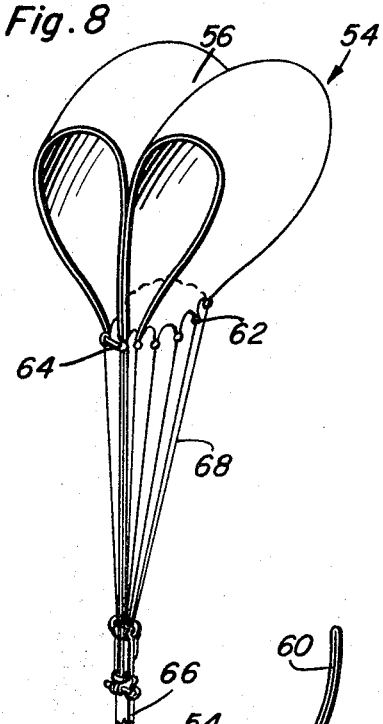
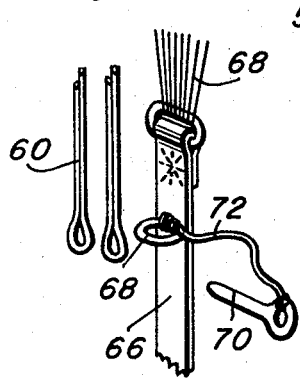
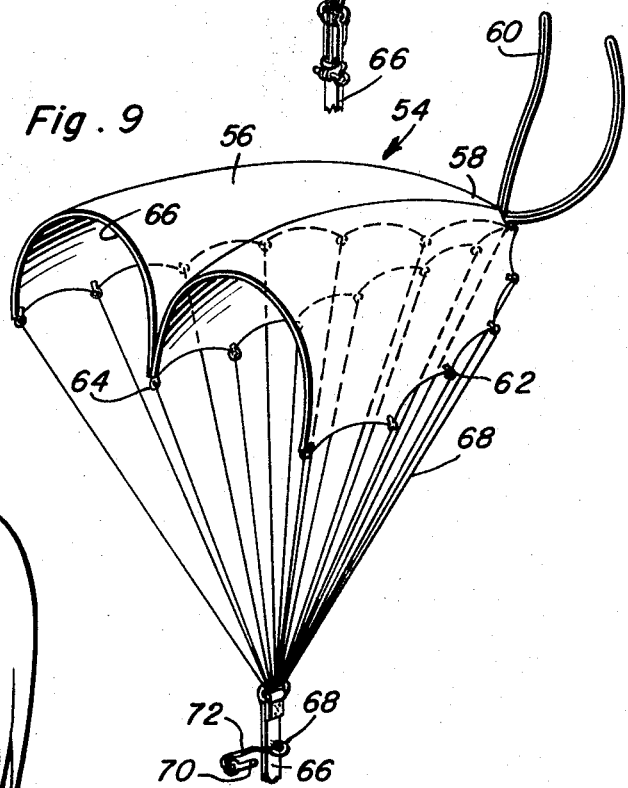
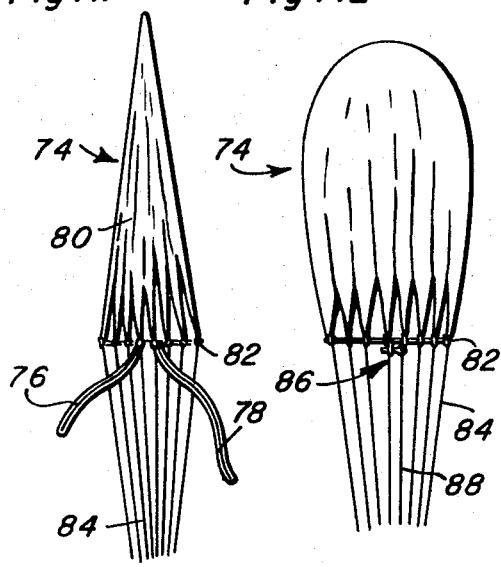

MANUALLY RELEASED REFINING CONTROL

This invention relates in general to controlled inflation of parachutes and more particularly to a manually releasable reefing system for restricting canopy inflation to a two-stage parachute opening operation.

Reefing systems for controlling the opening of parachutes tend to become somewhat complex and therefore unreliable. Furthermore, prior art reefing systems for parachute canopies are generally limited to particular types of canopies and are often unable to actually stage the opening of the parachute but merely delay abrupt inflation of the parachute canopy. It is therefore an important object of the present invention to provide a parachute reefing system for staged inflation of the parachute canopy in a reliable manner. It is a further object to provide a reefing system which is economical, simple and applicable to all types of parachute canopies.

In accordance with the present invention, a reefing system is provided for a parachute in order to provide initial drag thereby allowing the total system velocity to reduce before full canopy inflation is permitted to take place. Also in connection with asymmetrical types of canopies, less stable lobes of the canopy are permitted to inflate at a relatively low air speed in order to minimize instability problems such as "tuck under." The staged inflation of the canopy is under control of the jumper and is achieved in one embodiment by the anchoring of two snubber loops to the parachute canopy and threading said loops through peripherally located guide rings on the canopy. The ends of the loops are threaded through a common lock ring and held in place by insertion of a lock pin through both loops so as to prevent withdrawal of the loops from the guide rings under the inflation pressure of the canopy. In this reefed condition of the parachute canopy, a reduction in system velocity is effected before full inflation of the canopy is permitted. The lock pin is withdrawn by a pull exerted on a remote control lanyard to which the lock pin is connected to release the loops. The releasing lanyard will have an actuator portion readily accessible to the jumper.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of a sail wing type of parachute in a partially reefed condition with the reefing system of the present invention installed.

FIG. 2 is a perspective view of the parachute shown in FIG. 1 in a fully inflated condition.

FIG. 3 is a partial perspective view showing one form of anchoring facility for the snubber loops of the reefing system.

FIG. 4 is a partial perspective view showing another form of anchoring means for the snubber loops.

FIG. 5 is a partial perspective view showing the locking facilities for the snubber loops.

FIG. 6 is a partial perspective view showing the locking facilities in a released condition.

FIG. 7 is a front elevational view of the sail wing type of parachute in a fully reefed condition in accordance with the present invention.

FIG. 8 is a perspective view of a para-wing type of parachute in a fully reefed condition.

FIG. 9 is a perspective view of the parachute shown in FIG. 8 in a fully inflated condition.

FIG. 10 is a partial perspective view showing the locking facilities associated with the reefing system applied to the parachute shown in FIGS. 8 and 9.

FIG. 11 is a front elevational view of a conventional, flat circular type of parachute with the reefing facilities of the present invention applied but in a released condition.

FIG. 12 is a front elevational view of the parachute of FIG. 11 in a fully reefed condition.

Referring now to the drawings in detail, and initially to FIGS. 1, 2 and 7, a sail wing type of parachute generally denoted by reference numeral 10 is shown. In this parachute, the canopy generally denoted by reference numeral 12 is of the asymmetrical type and includes a central lobe 14 and two end lobes 16 and 18 extending between a leading edge 20 and a trailing edge 22. Suspension lines 24 are peripherally connected to the canopy and to the payload (not shown) by conventional means including the buckle 26 and riser strap 28 as shown in FIG. 7. As is well known by those skilled in the art, when the parachute 10 is deployed, the canopy 12 abruptly opens or is rapidly inflated to the condition shown in FIG. 2. Particularly in connection with asymmetrical types of parachute canopies such as that shown in FIGS. 1, 2 and 7, canopy displacement and deformation often occurs in an asymmetrical fashion causing collapse or "tuck under" of the lobes during high speeds. To avoid this problem, the reefing system of the present invention is installed which includes the anchoring of at least two snubber loops 30 and 32 to the leading edge 20 of the parachute canopy in the embodiment illustrated in FIGS. 1, 2 and 7.

As more clearly seen in FIG. 2, each of the loops 30 and 32 is secured to the canopy by anchoring rings 34 and 36 which are identical to each other but are secured to the canopy in spaced relationship to each other as shown. Each of the loop anchoring rings is secured to the canopy in any suitable fashion as shown in detail in FIG. 3. Alternatively, both of the snubber loops 30' and 32' could be anchored at the same location to the canopy by a common anchor ring 34' as illustrated in FIG. 4.

Peripherally secured in spaced relationship to each other about the parachute canopy are a plurality of guide rings 38 to which the suspension lines 24 may be secured if desired. The loops 30 and 32 are threaded through the guide rings from the anchoring rings 34 and 36 and finally threaded through a common lock ring 40 secured to the canopy in remote spaced relationship to the anchoring rings as more clearly seen in FIGS. 5 and 6. When so threaded through the guide rings 38 and the common lock ring 40, the loops 30 and 32 may be prevented from being withdrawn from the rings under the inflating pressure of the canopy by a lock pin 42 extending through the loop ends of both loops 30 and 32 and thereby held in abutment with the lock ring 40 as shown in FIG. 5. The canopy will then be in a fully reefed condition as shown in FIG. 7. The extent to which the canopy is reefed will of course depend upon the lengths of the loops 30 and 32. Further, where the loops are anchored to the canopy by spaced anchoring rings 34 and 36, because of the offset relationship of these anchor locations to the common lock ring 40, one of the loops will be longer than the other so that both may extend through the common lock ring by the same amount when engaged by the lock pin 42.

The lock pin is held assembled on the lock ring 40 by a flexible rubber band 44 or the like as shown in FIG. 5 which will permit its withdrawal from the engaging ends of the loops to release the same as shown in FIG. 6. The lock pin may be withdrawn by means of a remote control device including a flexible lanyard 46 secured to the eye portion 48 of the lock pin as shown in FIG. 5, the lanyard being connected with the adjacent suspension line 44 by means of a flexible and slack retainer line 50. The actuator end portion of the releasing lanyard 46 may be made accessible to the jumper so that he may exert a pull thereon in order to release the reefing system after initial deceleration under the reefed condition of the parachute. Toward this end, the lower end of the releasing lanyard 46 may be anchored to the riser 28 at location 52 as shown in FIG. 7.

FIGS. 8 and 9 illustrate a para-wing type of parachute 54 to which the reefing system of the present invention is also applicable. In this type of parachute, the canopy 56 has a nose portion 58 to which the two reefing loops 60 are anchored as more clearly seen in FIG. 9. These loops are threaded through the peripherally spaced guide rings 62 and through a common lock ring 64 at the leading edge 66 of the canopy when the parachute is in its fully reefed condition as shown in FIG. 8. In this condition, the two loops extend downwardly from the common guide ring 64 to the lock means located on the riser strap 66 from which the suspension lines 68 extend to the canopy. The lock means includes a lock ring 69 as more clearly seen in FIG. 10 and a lock pin 70 connected thereto by a flexible retainer line 72 so that the reefing loops 60 may be prevented from being withdrawn from the guide rings under inflation pressure, in a manner similar to that described hereinbefore in connection with the lock pin 42. With the lock means mounted on the riser strap 66, it will of course be accessible to the jumper.

FIGS. 11 and 12 show the same type of reefing system applied to a conventional, flat circular type of parachute 74. Thus, reefing loops 76 and 78 are anchored to the periphery of the canopy 80 and are adapted to be threaded through the guide rings 82 from which the suspension lines 84 extend downwardly to the payload. Locking means 86 similar to the locking means hereinbefore described, prevents withdrawal of the threaded reefing loops from the guide rings as shown in FIG. 12 illustrating the parachute in a fully reefed condition. The locking means may be released as hereinbefore described by a manual pull exerted on a releasing control lanyard 88 as shown in FIG. 12 remote from the canopy. The locking means 86 will be located substantially 180° from the anchoring locations for the loops 76 and 78.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a parachute having a canopy, a riser and suspension lines interconnected between the riser and the canopy, reefing control means for restricting inflation of the canopy comprising at least two loops anchored to the canopy, guide means secured at spaced locations to the canopy for threadedly receiving the loops in a reefed condition of the canopy, lock means engageable with the loops in the reefed condition of the canopy for interconnecting the same to prevent withdrawal of the loops from the guide means, and means for releasing the lock means to permit withdrawal of the loops from the guide means in response to inflation of the canopy.

2. In combination with a parachute having a canopy, a riser and suspension lines interconnected between the riser and the canopy, reefing control means for restricting inflation of the canopy comprising at least two loops anchored to the canopy, guide means secured at spaced locations to the canopy for threadedly receiving the loops in a reefed condition of the canopy, lock means engageable with the loops in the reefed condition of the canopy for preventing withdrawal of the loops from the guide means, and means for releasing the lock means to permit withdrawal of the loops from the guide means in response to inflation of the canopy, said lock means including a lock ring element through which both of the loops are threaded, a lock pin held by said loops in abutment with the ring element and a flexible retainer connecting the lock pin to the ring element.

3. The combination of claim 2 wherein said lock ring element is anchored to the canopy remotely spaced from the anchor locations for the loops.

4. The combination of claim 2 wherein said lock ring element is mounted on the riser.

5. The combination of claim 2 wherein said releasing means includes a manually tensioned lanyard conected to the lock pin for withdrawal thereof from the loops.

6. The combination of claim 2 including means for anchoring ends of the loops to the canopy in spaced adjacency to each other at predetermined anchor locations.

7. The combination of claim 6 wherein the guide means comprises a plurality of rings secured to the canopy in peripherally spaced relation to each other.

8. The combination of claim 7 wherein said releasing means includes a manually tensioned lanyard connected to the lock pin for withdrawal thereof from the loops.

9. The combination of claim 8 wherein said retainer is anchored to one of the suspension lines adjacent to the lock ring element.

10. The combination of claim 9 wherein said lock ring element is anchored to the canopy remotely spaced from the anchor locations for the loops.

11. The combination of claim 7 wherein said lock ring element is mounted on the riser.

12. In combination with a parachute having a canopy to which suspension lines are connected, reefing control means for restricting inflation of the canopy comprising loop means anchored to the canopy, guide means secured at spaced locations to the canopy for threadedly receiving the loop means in a reefed condition of the canopy, lock means engageable with the loop means for preventing withdrawal thereof from the guide means and release means connected to the lock means for disengagement thereof from the loop means to permit withdrawal of the loop means from the guide means.

13. In combination with a parachute having a canopy from which a payload is suspended by suspension lines, releasable reefing means for restricting inflation of the canopy, remote control means connected to the reefing means, lock means engageable with the reefing means in the reefed condition of the canopy for preventing release thereof, and actuating means connected to the remote control means adjacent to the payload for releasing the lock means to permit inflation of the canopy.

14. The combination of claim 13, wherein said remote control means comprises a tensioned lanyard.

15. The combination of claim 14 including a riser strap connecting said suspension lines to the payload, and means for anchoring the lanyard to the riser strap adjacent to the actuating means, said actuating means being constituted by an end portion of the lanyard.

16. The combination of claim 13 including a riser strap connecting said suspension lines to the payload, and means for anchoring the remote control means to the riser strap adjacent to the actuating means.

* * * * *